United States Patent
Rozelle et al.

[11] Patent Number: 6,120,719
[45] Date of Patent: Sep. 19, 2000

[54] METHOD OF JOINING PLASTIC PREFORMS TO ENCAPSULATE AN ARTICLE

[75] Inventors: Darryl E. Rozelle, Chaska; Vernon H. Gothman, Buffalo; Michael R. Baxter, Chanhassen, all of Minn.

[73] Assignee: FSI International, Inc., Chaska, Minn.

[21] Appl. No.: 09/216,106

[22] Filed: Dec. 18, 1998

[51] Int. Cl.[7] .................................................. B29C 65/00
[52] U.S. Cl. ......................... 264/248; 264/249; 427/375
[58] Field of Search ................... 156/60, 242; 264/239, 264/241, 248, 249, 339; 427/369, 370, 375; 438/15

[56] References Cited

U.S. PATENT DOCUMENTS

| | | | |
|---|---|---|---|
| 2,487,816 | 11/1949 | Lindsey | 216/29 |
| 3,052,163 | 9/1962 | Schubert | 93/1 |
| 3,962,016 | 6/1976 | Alfter et al. | |
| 4,300,581 | 11/1981 | Thompson. | |
| 4,366,014 | 12/1982 | Pollard | 156/157 |
| 4,407,691 | 10/1983 | Ishii et al. | 156/304.2 |
| 4,579,617 | 4/1986 | Öberg et al. | 156/184 |
| 4,586,624 | 5/1986 | Shaw. | |
| 4,929,293 | 5/1990 | Osgar | 156/158 |
| 4,957,570 | 9/1990 | Jenkins et al. | 156/64 |
| 5,298,713 | 3/1994 | Marlin | 219/121.46 |
| 5,328,541 | 7/1994 | Usui et al. | 156/304.2 |
| 5,609,713 | 3/1997 | Kime et al. | 156/304.2 |

*Primary Examiner*—Charles Bowers
*Assistant Examiner*—Evan Pert
*Attorney, Agent, or Firm*—Faegre & Benson LLP

[57] ABSTRACT

A method and apparatus are presented for encapsulating an article comprising, for example, a substantially circular turntable (12) having first and second opposed major surfaces (16 & 18), each major surface sharing an outer peripheral sidewall (20). First and second thermoplastic pre-forms (28 & 30) are fitted to sandwich the article and are sealed to encapsulate by rotating a thermoplastic band (32) onto and around the exposed seam (48) while applying pressure (70) and heat (74) to obtain a fused bonded reliable encapsulating joint (72). The method and apparatus presented are particularly well suited for encapsulating metal platens, holders, and internal parts of process equipment used in the semiconductor manufacturing industry to avoid contamination from the encapsulated metal. The method could be used to encapsulate any article having a rotatable outer seam of adjacent polymeric pre-forms residing on a relatively narrow peripheral sidewall surface of the article, which is substantially parallel to the axis of rotation.

17 Claims, 6 Drawing Sheets

METHOD OF JOINING PLASTIC PREFORMS TO ENCAPSULATE AN ARTICLE

FIELD OF THE INVENTION

This invention relates to methods and structures in which polymer parts are welded together to encapsulate an underlying structure. More specifically, this invention relates to methods and structures in which cover elements overlying the major faces of a substrate are encapsulatingly joined to each other via a joint formed around the periphery of the substrate. The present invention is particularly useful to encapsulate processing equipment used in the manufacture of microelectronic devices, particularly with inert polymer materials, because the resultant joints are impermeable, chemically resistant, and strong for long service life.

BACKGROUND OF THE INVENTION

There are many circumstances in which it is desirable to encapsulate a substrate with some kind of protective barrier. In some circumstances, encapsulation can be used to protect the substrate from the environment in which the substrate will be used. For example, encapsulation is useful when the substrate is a metal component or the like that is to be used in a marine environment where salt water or the corresponding vapor or mist can corrode or otherwise damage the unprotected component. Encapsulation can also be used to protect processing equipment to be used in acidic, basic, reducing, or oxidizing environments.

In other circumstances, it may be desirable to protect items in the environment from the substrate itself. For instance, one step of manufacturing microelectronic devices involves processing those devices while the devices are supported upon some kind of structure, such as a wafer cassette, platform, transport apparatus, rotating turntable, and/or the like. For strength, rotating turntables and other structures used to process microelectronic devices are often formed from one or more metals, metal alloys, intermetallic compositions, or the like. Unfortunately, metal ions from such metallic structures can migrate from the structures into the devices being processed. This is especially problematic in the manufacture of semiconductor devices, where metal contamination of the devices can impair or even destroy the functional capability of the devices. To protect microelectronic devices from contamination during processing, the industry has encapsulated one or more components of the processing equipment in an inert polymer, e.g., a fluoropolymer such as perfluoroalkoxy polymer (PFA), a fluoroethylene polymer (FEP), an ethylene tetra fluoroethylene polymer, (ETFE), a polyvinylidene fluoride polymer (PVDF), a polyvinyl fluoride polymer (PVF), combinations of these, and the like.

To encapsulate a particular structure with an inert polymer, one or more encapsulating parts may be preformed and then assembled around the structure. The parts may be joined using glue, fusing techniques, or the like. In the microelectronics industry, the encapsulating joints must be strong enough so that the encapsulated structure can withstand the rigors of use over a reasonably long service life. If the substrate comprises metal, the encapsulation joint should be impermeable to metal ions.

Figure 1:
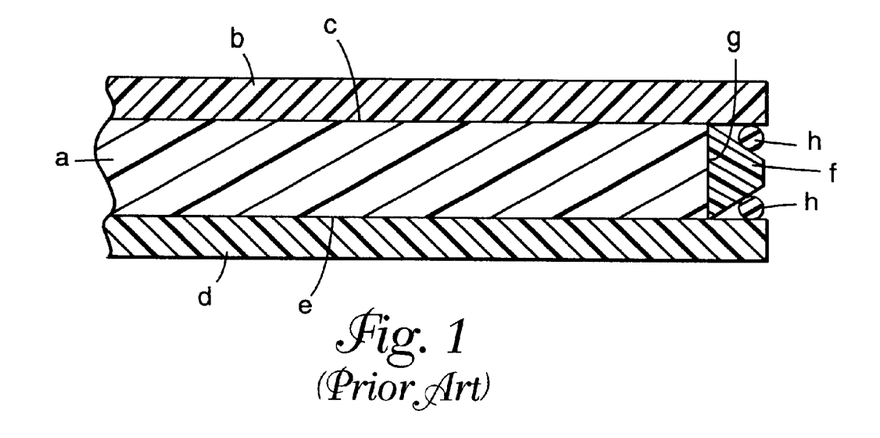
FIG. 1 is a cross-sectional sideview of encapsulating parts fitted around a substrate in accordance with conventional practices.

Forming encapsulating joints that meets the stringent demands of the microelectronic industry has been extremely challenging. The difficulty is due, at least in part, to the complex geometry of the structures that require encapsulation. For example, the MERCURY® centrifugal spray processors commercially available from FSI International, Chaska, Minn., each includes an encapsulated, rotating turntable that supports several wafer cassettes during processing. This turntable has projecting, upright structures that help hold the wafer cassettes, and these make it difficult to satisfactorily bond encapsulating elements over the turntable to effectively seal the major faces and sidewall of the turntable. For example, as shown in FIG. 1, such a turntable (a) is schematically shown as being encapsulated by a first cover (b) fitted over the top face (c) of the turntable (a) and a second cover (d) fitted over the bottom face (e) of the turntable. The encapsulating joint between the two covers (b) and (d) is formed by placing a sideband (f) around the sidewall (g) of turntable (a) and then fusing the first and second covers (b) and (d) to this sideband (f) via welding beads (h).

It is very time-consuming, and thus very expensive in terms of manufacturing cost, to provide a satisfactory encapsulating joint between major face cover elements when using the approach of FIG. 1. What is needed is a better, more efficient way to encapsulate this kind of structure.

SUMMARY OF THE INVENTION

The present invention advantageously provides an approach for forming a strong, impermeable, encapsulating joint around the periphery of a substrate, such as around the periphery of the turntable used in the MERCURY® centrifugal spray processor. The joint is easy and economical to make using simple equipment. The joint can be sealed using any kind of desired joining technique, such as glueing, welding, or the like, although welding is the preferred technique for joining encapsulating parts formed from thermoplastic polymers.

In one aspect, the present invention relates to an encapsulated article comprising a substrate having first and second opposed major faces, each face having an outer periphery. A first cover is fitted over the first major surface of the turntable platform. The first cover comprises a first cover face panel overlying at least a portion of the first major surface of the platform and a first peripheral sidewall extending beyond the outer periphery of the first major face. A second cover is fitted over the second major surface of the turntable platform. The second cover comprises a second cover face panel overlying at least a portion of the second major surface of the platform and a second peripheral sidewall extending beyond the outer periphery of the second major face. A sideband extends around and is attached to at least a portion of the peripheral sidewalls of the covers such the sideband and the peripheral sidewalls cooperate to form an encapsulating joint.

In another aspect, the present invention relates to a method of encapsulating a substrate in circumstances in which the substrate has first and second opposed major faces with respective outer peripheries. The method involves positioning a first cover over the first major face of the turntable platform such that a peripheral sidewall of the first cover extends beyond the outer periphery of the first major face. A second cover is positioned over the second major face of the turntable platform such that a peripheral sidewall of the second cover extends beyond the outer periphery of the second major face. A sideband is attached around at least a portion of the peripheral sidewalls of the first and second covers such that the sideband and peripheral sidewalls cooperate to from an encapsulation joint.

In another aspect, the present invention relates to a centrifugal spray processor for processing microelectronic devices. The device includes a processing chamber and a turntable rotatably mounted in the processing chamber. The turntable comprises a top surface, a bottom surface, and a plurality of uprights projecting upward from the top surface in a manner effective to support a plurality of wafer cassettes during spray processing. A spray post is positioned in the processing chamber in a manner effective to deliver one or more chemicals onto a plurality of microelectronic devices stored in the wafer cassettes during processing. A first encapsulating cover is fitted over at least a portion of the first major surface of the turntable platform. The first cover comprises a first cover face panel overlying at least a portion of the first major surface of the platform and a first peripheral sidewall extending beyond the outer periphery of the first major face. A second encapsulating cover is fitted over at least a portion of the second major surface of the turntable platform. The second cover comprises a second cover face panel overlying at least a portion of the second major surface of the platform and a second peripheral sidewall extending beyond the outer periphery of the second major face. A sideband extends around and is attached to at least a portion of the peripheral sidewalls of the first and second covers such the sideband and the peripheral sidewalls cooperate to form an encapsulating joint.

BRIEF DESCRIPTION OF THE DRAWINGS

The above mentioned and other advantages of the present invention, and the manner of attaining them, will become more apparent and the invention itself will be better understood by reference to the following description of the embodiments of the invention taken in conjunction with the accompanying drawings, wherein.

DETAILED DESCRIPTION OF THE PRESENTLY PREFERRED EMBODIMENTS

The embodiments of the present invention described below are not intended to be exhaustive or to limit the invention to the precise forms disclosed in the following detailed description. Rather the embodiments are chosen and described so that others skilled in the art may appreciate and understand the principles and practices of the present invention.

Figure 2:
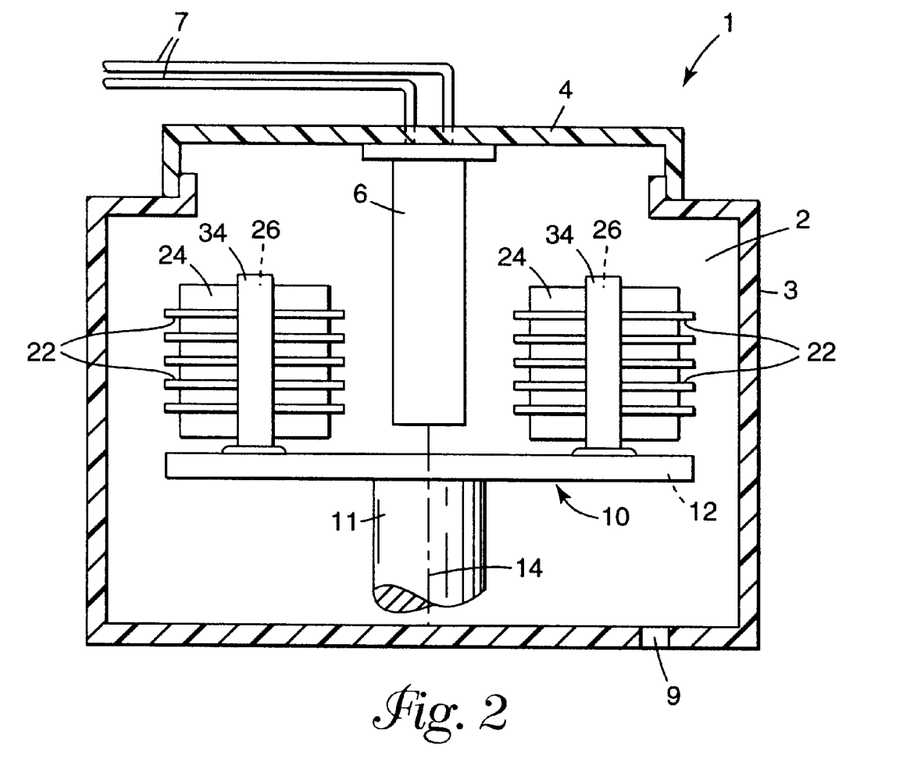
FIG. 2 is a schematic side view of a centrifugal spray processor incorporating an encapsulated turntable of the present invention.
Figure 3:
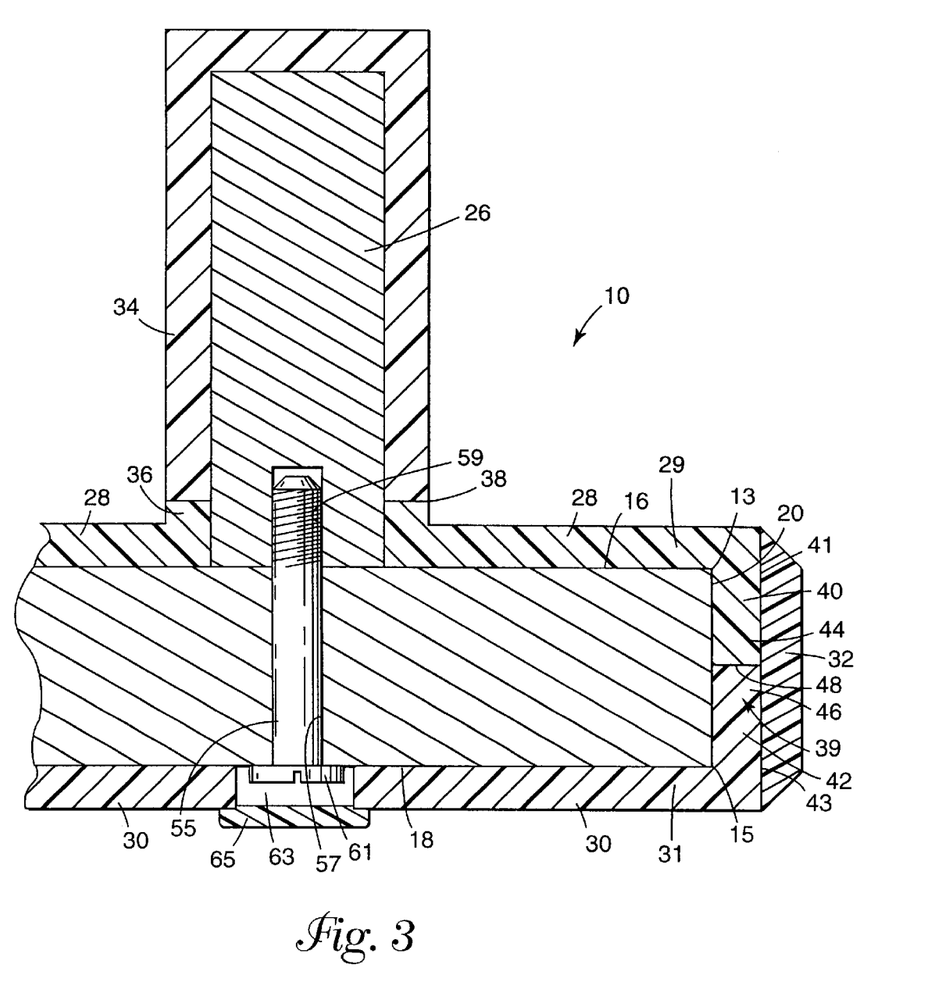
FIG. 3 is a side cross-sectional view of a portion of the encapsulated turntable of FIG. 2 showing how the sideband is attached to the flanges of the top and bottom encapsulating covers.
Figures 4, 5, 6:
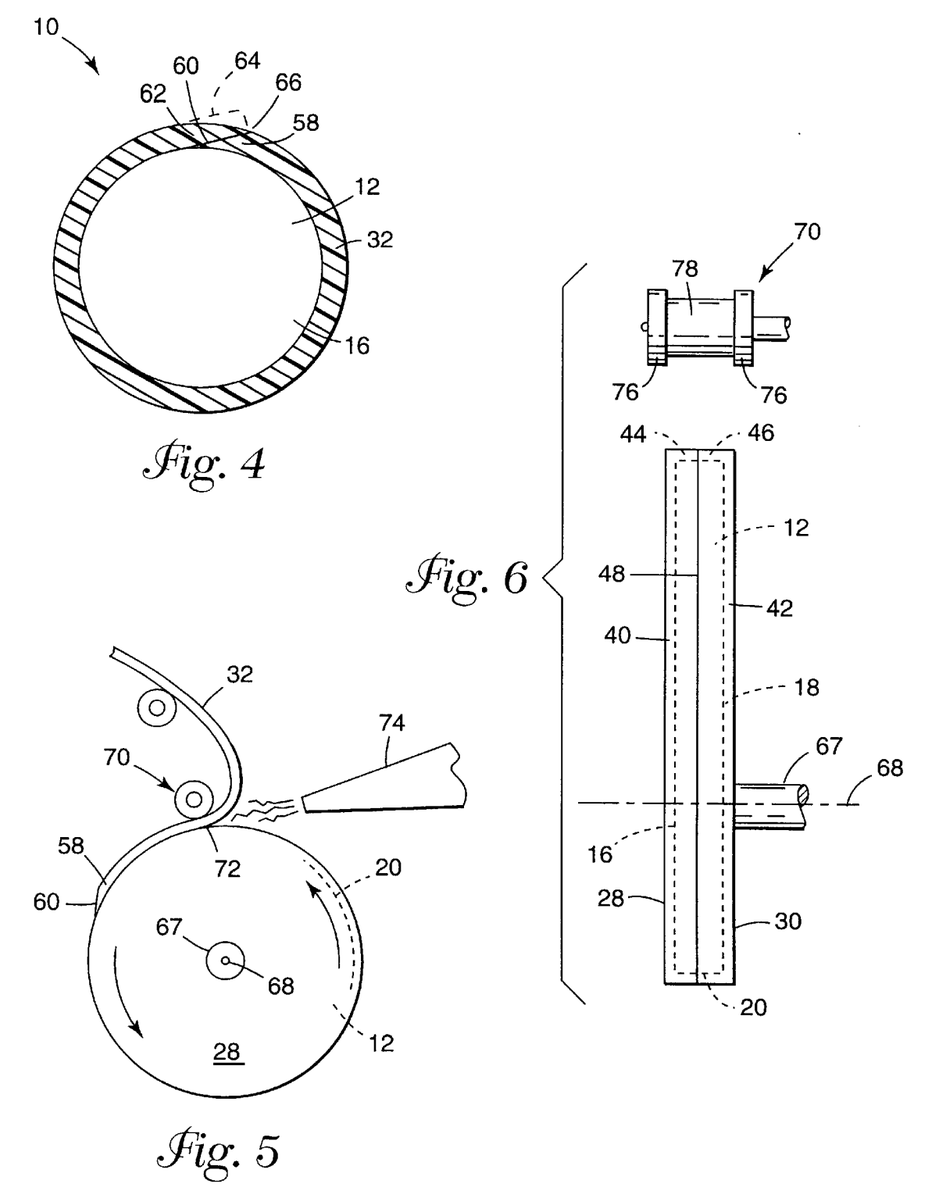
FIG. 4 is a cross-sectional top view of a portion of the turntable platform of FIG. 2 showing how the ends of the sideband are joined together.
FIG. 5 is a side view of a schematic illustration showing how the sideband is attached to the flanges of the top and bottom covers.
FIG. 6 is an end view (sideband not shown) corresponding to the side view of FIG. 5.

The present invention may be used to form encapsulating joints around the periphery of a wide variety of substrates or other components, especially where there is a need to protect the encapsulated substrate from the environment in which the substrate is used or a need to protect items in the intended operating environment from the substrate. For purposes of illustration, the principles of the present invention will now be described in the context of forming an encapsulating joint around the peripheral sidewall of a metallic turntable used in the MERCURY® centrifugal spray processors commercially available from FSI International, Chaska, Minn. This application of the invention is shown in FIGS. 2 through 4. The present invention is particularly useful for encapsulating devices, such as this turntable, because the encapsulating joint that is formed is strong for long service life, chemically resistant, and impermeable. Although the present invention will be described in connection with this particular kind of turntable, the present invention may be used to form encapsulation joints around the periphery of a wide variety of other substrates or components, including but not limited to other kinds of components used in other types of microelectronic device processing equipment (or any other type of apparatus) as well as other substrates that may be metallic or nonmetallic.

Referring now to FIGS. 2 through 4, centrifugal spray processing apparatus 1 includes processing chamber 2 defined by housing 3 and lid 4. Encapsulated turntable 10 is rotatably mounted in processing chamber upon shaft 11 such that turntable 10 is rotatable about axis 14. Turntable 10 includes turntable platform 12 including a top major surface 16, a bottom major surface 18, and a peripheral sidewall 20 interconnecting the top and bottom surfaces 16 and 18. Turntable platform 12 is encapsulated by top cover 28, bottom cover 30, and sideband 32.

One or more cassettes 24 holding semiconductor wafers 22 are supported above turntable platform 12 upon one or more corresponding encapsulated uprights 26. Spray post 6 delivers one or more processing chemicals onto wafers 22. The chemicals are supplied from suitable sources (not shown) via supply lines 7, as appropriate. Chemicals are discharged from processing chamber 2 through one or more outlets 9.

Each upright 26 is encapsulated with a sleeve 34. Each sleeve 34 is sealingly attached to a corresponding boss 36 on top cover 28 at a joint 38. Sleeves 34 are attached to bosses 36 in any suitable manner, e.g., welding. During wafer processing, the turntable 10 and cassettes 24 of semiconductor wafers 22 rotate about the turntable axis 14 as various chemical solutions are sprayed on the wafers 22. This technique, centrifugal spray processing, is commonly used to condition wafer surfaces at different stages in the semiconductor device manufacturing process.

The structure of the encapsulating joint 39 formed around the periphery of turntable platform 12 is seen best in FIG. 3. Each major face of turntable platform includes a corresponding outer periphery 13 and 15. To form joint 39, top cover 28 includes flange 40 that extends from face panel 29 to wrap around and extend partially across peripheral sidewall 20. Flange 40 thus has free end 44 that is distal from face panel 29, but proximal to flange juncture 48. Preferably, face panel 29 and flange 40 are dimensioned so that top cover 28 fits snugly over turntable platform 12 with little if any free play between the top cover 28 and the turntable platform 12. In a similar fashion, bottom cover 30 includes flange 42 that extends from face panel 31 to wrap around and extend partially across peripheral sidewall 20. Flange 42 thus has free end 46 that is distal from face panel 31, but proximal to flange juncture 48. Preferably, face panel 31 and flange 42 are dimensioned so that bottom cover 30, like top cover 28, fits snugly over turntable platform 12 with little if any free play between the parts. Each of flanges 40 and 42 has its own peripheral sidewall 41 and 43 that is positioned beyond the outer peripheries 13 and 15. Sidewalls 41 and 43 thus provide unobstructed bonding surfaces for attaching sideband 32.

Flanges 40 and 42 may extend across peripheral sidewall 20 towards each other such that free ends 44 and 46 meet and contact each other along at least a portion, and more preferably substantially along the entirety of, flange juncture 48, as shown. This is a preferred configuration, because this allows free ends 44 and 46 to be attached to each other by fusing or the like along one or more portions, or the entirety if desired, of flange juncture 48. This not only helps form a better encapsulating seal at joint 39, but also makes it easier to hold top and bottom covers 28 and 30 on turntable platform 12 while sideband 32 is attached to flanges 40 and 42. Sideband 32 extends around at least a portion, more preferably all, of peripheral sidewalls 41 and 43 is thus attached to flanges 40 and 42 so that sideband 32 overlies flange juncture 48. This structure advantageously allows sideband 32, flange 40 and flange 42 to cooperate to form an excellent encapsulating joint 39 around the periphery of sidewall 20.

As seen best in FIG. 4, sideband 32 optionally has a first end 58 configured with taper 60 and a second end 62 that overlies and is attached to taper 60 at first end 58. Taper 60 allows second end 62 to fit flush over first end 58. Excess material 64 of second end 62 can be removed to provide sideband 20 with a smooth contour over joint 66 between ends 58 and 60. Preferably, as shown, sideband 32 is undersized relative to the total width from the top and bottom of encapsulated turntable 10 so that no portion of sideband 32 extends upward above the encapsulated top surface of turntable 10 or downward below the encapsulated bottom surface of turntable 10. Such undersizing is desirable in connection with turntable 10, because oversized portions of sideband 32 that project too far upward or downward could interfere with the flow of liquid off of turntable 10 as it rotates during processing. Of course, in other applications in which the present invention might be used, oversized portions forming a lip around the periphery of an encapsulated substrate may be desirable in some instances.

As seen last in FIG. 3, upright 26 is secured to turntable 12 by bolt 55 that extends through aperture 57 and engages threaded aperture 59. Exposed head 61 of bolt 55 is covered within pocket 63 of bolt head cover 65.

The encapsulating covers 28 and 30, sleeves 34, and sideband 32 may be formed from a wide variety of different encapsulating materials depending upon the nature of the substrate being encapsulated and the type of benefit that encapsulation is desired to achieve. For instance, when encapsulating a metallic component of a semiconductor processing apparatus such as apparatus 10 of FIGS. 2 to 4, the encapsulating components are preferably formed from one or more polymer materials that prevent metal ions from the metallic component from undesirably contaminating wafers 22. The polymer materials also desirably have characteristics enabling the encapsulating components to withstand the expected processing conditions so that the encapsulated component has a reasonable service life. For example, if polymeric, the encapsulated material should not melt, burn, or otherwise degrade at the highest expected use temperature. The polymer materials should also be inert with respect to not only semiconductor wafers 22 but also to the chemical materials used to process wafers 22. The polymers may be thermoplastic or thermosetting, but are preferably thermoplastic so that the different encapsulating components can be fusibly bonded to each other to facilitate forming a welded joint.

With these concerns in mind, covers 28 and 30, sideband 32, and sleeves 34 preferably comprise one or more inert, thermoplastic fluoropolymers. Fluoropolymers offer many processing advantages. Firstly, fluoropolymers tend to be inert to many different kinds of chemicals, including acidic and basic chemicals, and also form an excellent barrier around metallic turntable platform 12. Fluoropolymers also tend to have high melting temperatures, so as to provide encapsulating protection at relatively high use temperatures. Representative examples of fluoropolymers include a fluoropolymer such as perfluoroalkoxy polymer (PFA), a fluoroethylene polymer (FEP), an ethylene tetra fluoroethylene polymer, (ETFE), a polyvinylidene fluoride polymer (PVDF), a polyvinyl fluoride polymer (PVF), combinations of these, and the like. Of these, PFA is preferred, because this polymer is melt processable, may be readily molded and machined, is inert to many chemicals used to process microelectronic devices, is impermeable to metal ions when used as an encapsulating material, and has a high service temperature.

The method of attaching sideband 32 to flange is 40 and 42 will now be described in connection with FIGS. 5 and 6. For purposed of clarity, upright sleeves 34 (FIGS. 2 to 4) typically would already be attached to their corresponding cover, but are omitted in FIGS. 5 and 6. To begin the attachment process, covers 28 and 30 are fitted over turntable platform 12. To help hold covers 28 and 30 in position, free ends 44 and 46 of flanges 40 and 42 may be attached to each other at one or more positions along the length of flange juncture 48. This may be accomplished by securing the free ends 44 and 46 of flanges 40 and 42 together using any convenient means. For example, flanges 40 and 42 can be mechanically compressed against each other by spring elements 45 in a conventional manner so that free ends 44 and 46 are held together during attachment of the sideband 32. While being compressed together, free ends 44 and 46 may be fused together at one or more attachment positions using a suitable heat source such as a heat gun or the like. It is also preferred that sleeves 34 already be attached to bosses 36 at this time.

With covers 28 and 30 in proper position, turntable platform 12 is mounted onto motor driven axle 67 so that turntable platform 12 can be caused to rotate around axis 68. Turntable platform 12 is then rotated at a suitable rotational speed to carry out attachment operations. Generally, if rotational speed of turntable platform 12 is too fast, the quality of the resultant bond between sideband 32 and flanges 40 and 42 may be poor. On the other hand, if the rotational speed of turntable platform 12 is too slow, the bond quality may also be unsatisfactory. Balancing these concerns, a turntable platform 12 having a diameter of about one to three feet is preferably caused to rotate at a rotational speed of about 1 to about 60 minutes per revolution, preferably about 20 to 40 minutes per revolution when the materials to be attached together comprise a fluoropolymer such as PFA. At this rotational speed, peripheral side wall 20 moves at a linear speed of about 0.1 cm per minute to 8 cm per minute.

As the turntable platform 12 rotates, sideband 32 is fed between guide roller 70 and turntable platform 12 such that sideband 32 contacts peripheral sidewalls 41 and 43 of flanges 40 and 42 at weld site 72. Guide roller 70 is biased towards turntable platform 12 so that guide roller 70 firmly holds sideband 32 against flanges 41 and 42 at weld site 72. As seen best in FIG. 6, starting end 58 of sideband 32 is attached to turntable platform 12 in a manner such that taper 60 faces outward so that second end 62 of sideband 32 can be flushly fused to taper 60. As seen best in FIG. 7, guide roller 70 includes shoulders 76 at each end and track region 78 between shoulders 76. Track region 78 is configured so that sideband 32 fits inside track region 78 during attachment operations. Track region 78 is centered over flange juncture 48 to ensure that sideband 32 is attached to flanges 40 and 42 in proper alignment.

As guide roller 70 pushes sideband 32 against turntable platform 12 at the weld site 72, heating device 74 directs heat at weld site 72 in a manner effective to fusibly weld sideband 32 to flanges 40 and 42 over flange joint 39. Heating device 74 may be any kind of conventional heating device that is capable of directing a suitable amount of heat at weld site 72 so that sideband 32 fuses to flanges 40 and 42. Examples of such heating devices include infrared heaters, heat guns that direct hot gas at weld site 72, or the like. Preferably, heating device 74 is a hot air gun.

As heat energy from heating device 74 is directed at weld site 72, sideband 32 is fusibly welded to flanges 40 and 42 in a position overlying flange juncture 48. As a result, sideband 32 and flanges 40 and 42 cooperate to form encapsulation joint 39 that is strong and impermeable. Semiconductor wafers 22 are thus protected against contamination from metal ions that might otherwise migrate from turntable platform 12. Turntable platform 12 is also protected against the corrosive chemicals used to process wafers 22.

After sideband 32 is attached around the periphery of turntable 12, the resultant joint 66 between second end 62 and first end 58 is shown in FIG. 5. Excess material region 64 can be removed using any convenient removal process, e.g., skiving or abrading.

The apparatus of FIGS. 5 and 6 describes an approach in which turntable 12 rotates, while heating device 74 is stationary. Of course, other approaches are possible. For example, turntable 12 could be stationary while heating device 74 is moved to heat successive portions of the parts to be welded. Further, both turntable 12 and heating device 74 could move to accomplish such relative movement, if desired.

Figure 7:
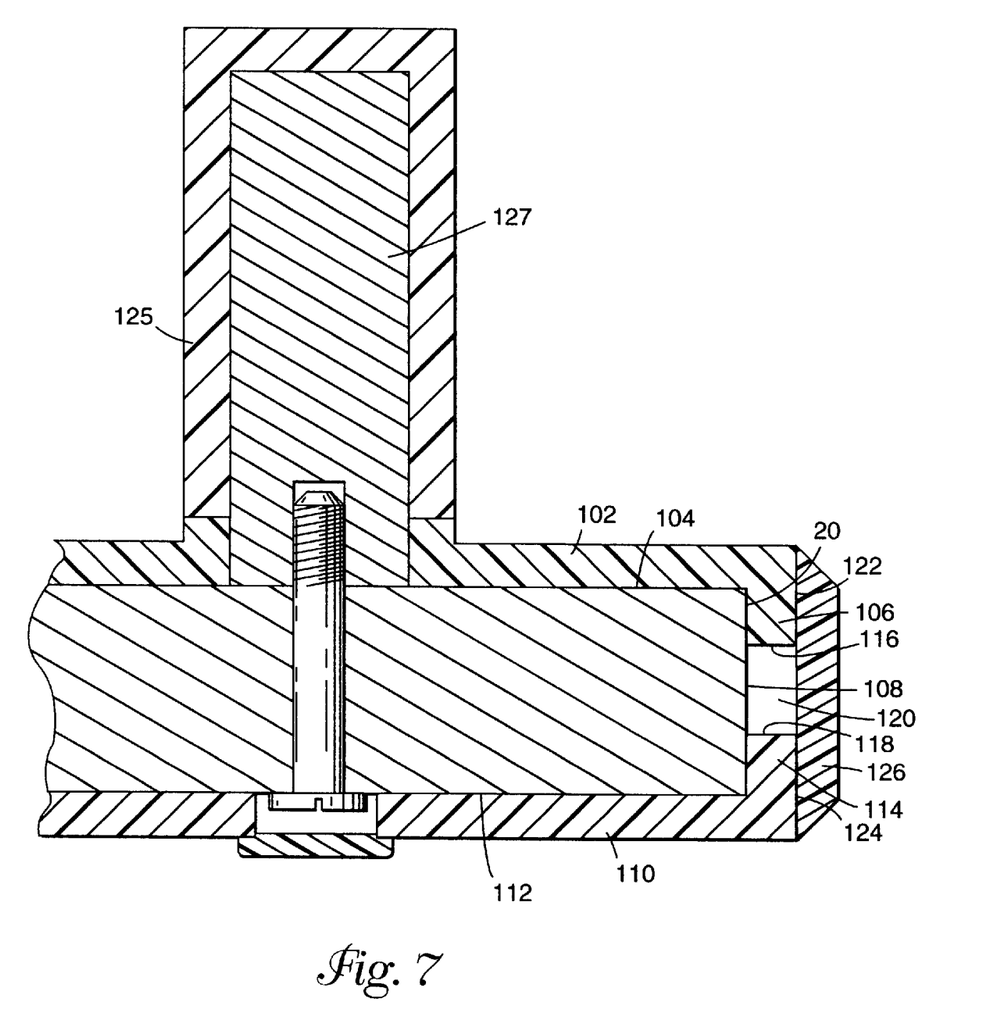
FIG. 7 is a side cross-sectional view of a portion of an alternative embodiment of an encapsulated joint having a gap formed between opposing flange ends.
Figure 8:
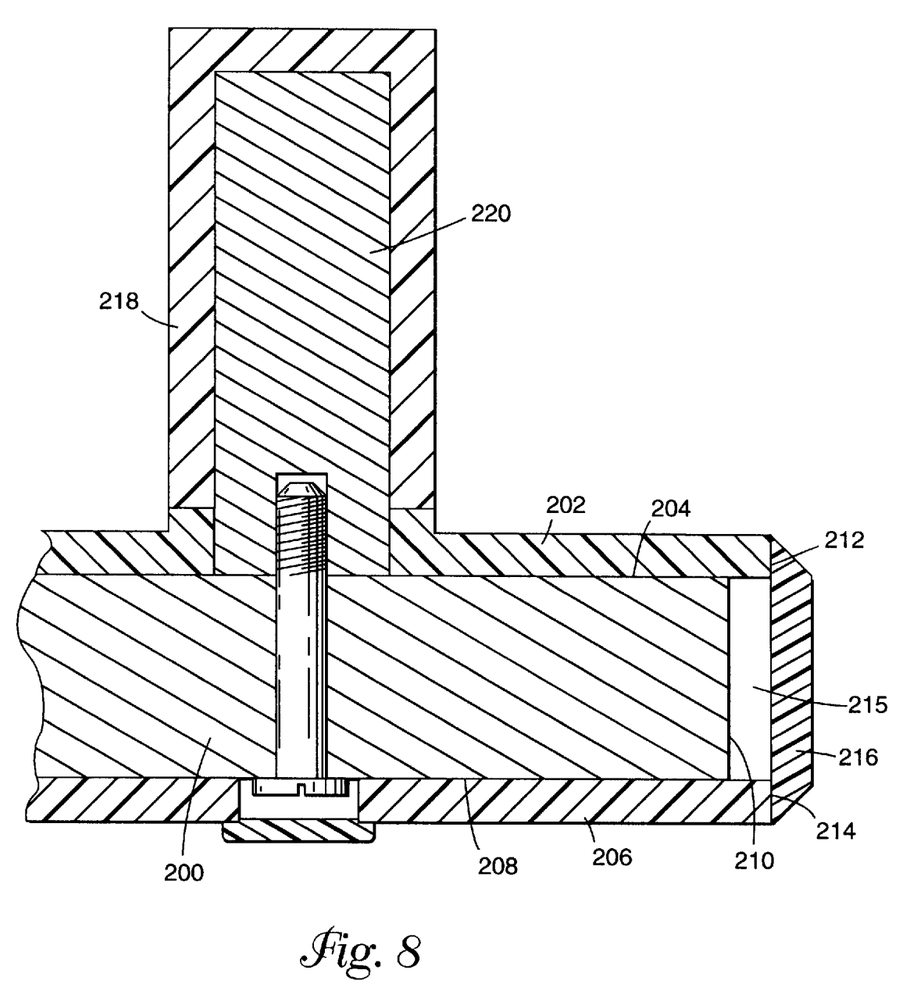
FIG. 8 is a side cross-sectional view of a portion of yet another alternative embodiment of an encapsulated joint having a gap formed between distal free ends of the upper and bottom covers that extend beyond the sidewall of the encapsulated substrate.

FIG. 7 illustrates an alternative encapsulation joint of the invention that can be used in connection with a substrate such as turntable 100 (generally identical to turntable 10, described above), a portion of which is shown in FIG. 8. Top cover 102 fits over top surface 104 and includes flange 106 fitting around peripheral sidewall 108 of turntable 100. Similarly, bottom cover 110 fits over bottom surface 112 and includes flange 114 fitting around peripheral sidewall 108. Each of flanges 106 and 114 had free ends 116 and 118, respectively, that are spaced apart so as to define gap 120 between them. Each of flanges 106 and 114 each has a peripheral sidewall 122 and 124, respectively positioned beyond the peripheral sidewall 108 to thus provide unobstructed bonding surfaces for the attachment of sideband 126. Sleeve 125 fits over upright 127 that projects upward from top surface 104.

FIG. 9 illustrates another embodiment of an encapsulation joint of the present invention that can be used in connection with a substrate such as turntable 200 (generally identical to turntable 10, described above), a portion of which is shown in FIG. 9. Top cover 202 fits over top surface 204 and bottom cover 206 fits over bottom surface 208. Each of covers 202 and 206 extends beyond peripheral sidewall 210 of turntable 200 such that each cover 202 and 206 is provided with unobstructed peripheral sidewalls 212 and 214 for attaching sideband 216. Gap 215 is thus formed. Sleeve 218 fits over upright 220 that projects upward from top surface 204. Advantageously, the fact that the covers 202 and 206 extend beyond turntable 200 allows sideband 216 to be compressed against covers 202 and 206 during bonding with as high a bonding pressure as is desired and/or practically feasible. Being able to attach sideband 216 to covers 202 and 206 is especially desirable in that good pressure is needed at the bond site to get an effective joint, particularly when welding is the bonding technique that is used. Indeed, the ability to apply compressive force against projecting bonding faces of the encapsulating covers is a benefit enjoyed by all embodiments of the invention described herein.

Figure 9:
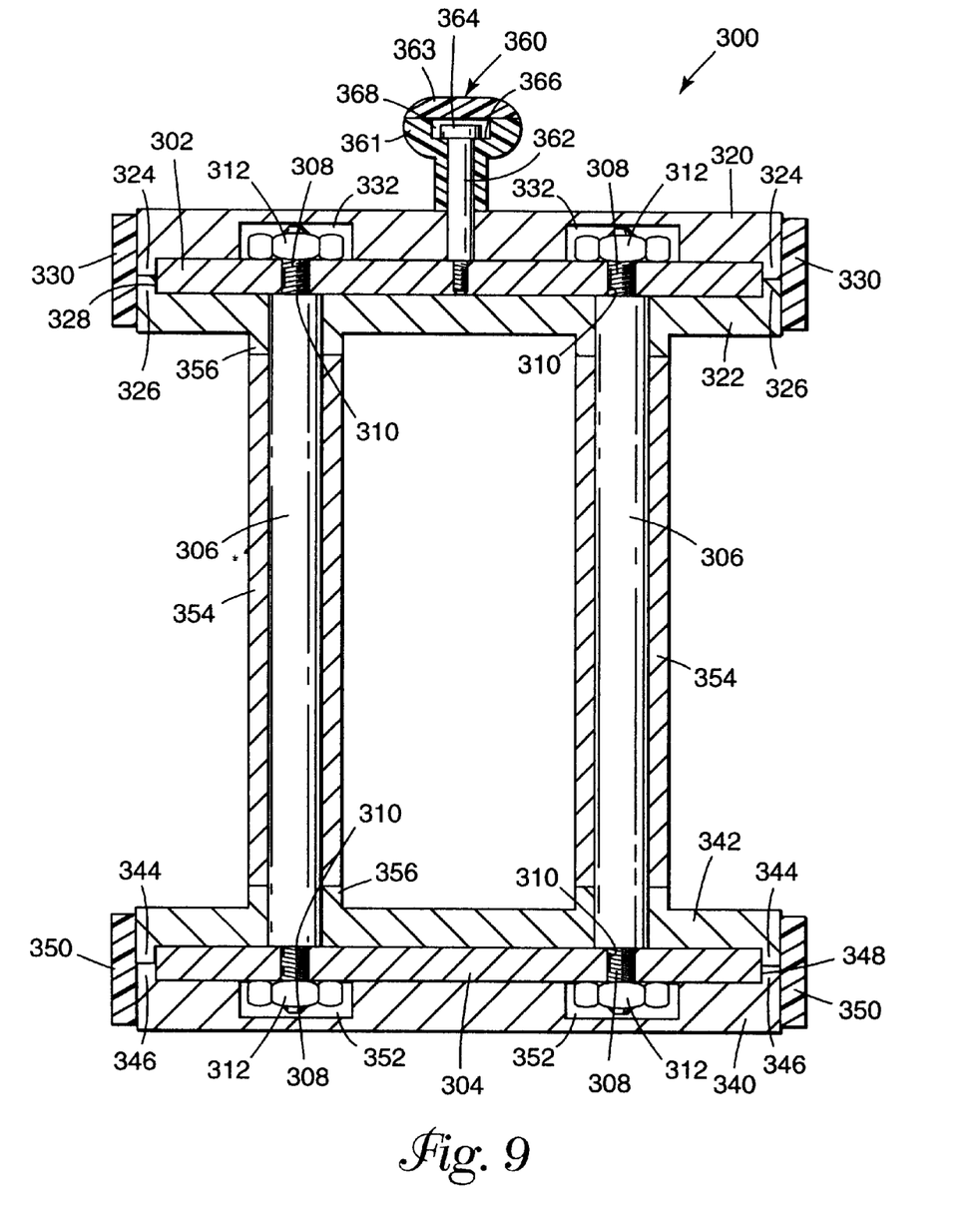
FIG. 9 is a side cross-sectional view of a wafer cassette encapsulated in accordance with the present invention.

The present invention has been described above in connection with encapsulating a turntable of the MERCURY® centrifugal spray processor. It can be appreciated, however, that the present invention is not limited to use with this particular structure, but can be used to encapsulate a wide variety of different structures in which an encapsulation joint is to be formed around the periphery of the structure. As one example of another application of the present invention, FIG. 9 schematically illustrates an encapsulated wafer cassette 300 that has been encapsulated, at least in part, using the principles of the present invention. Encapsulated wafer cassette 300 is of a standard industry design and is useful for holding a plurality of semiconductor wafers, commonly 25 wafers, during storage, transport, and/or processing.

Wafer cassette 300 includes upper plate 302, lower plate 304, and a plurality of uprights 306 extending between plates 302 and 304. Each upright includes threaded ends 308 that extend through apertures 310 so that plates 302 and 304 and uprights 306 can be secured together with nuts 312. Top plate 302 is encapsulated with top outside cover 320 and top inside cover 322. Covers 320 and 322 have flanges 324 and 326 that wrap around periphery 328 of top plate 302. Sideband 330 is attached to flanges 324 and 326 in accordance with the principles of the present invention. Top outside cover 320 includes countersinks 332 to fit over nuts 312. Corresponding bottom outer cover 340, bottom inner cover 342, flanges 344 and 346, periphery 348, sideband 350, and countersinks 352 are associated with lower plate 304. Sleeves 354 encapsulate uprights 306 and are attached to corresponding bosses 356 on the inside top and bottom covers 322 and 342. These sleeves 354 preferably may be attached to the corresponding bosses 356 using the sliding fixture approach.

Knob 360 is mounted at the top of cassette 300. Although one knob 360 is shown for clarity, preferred embodiments included three of such knobs to provide structure for an operator or robot to grab onto cassette 300 for transport purposes. Knob is held in place by bolt 362 that threadably engages upper plate 302. Bolt 362 is encapsulated by base 361 and cover 363. Bolt head 364 seats against should 366 in pocket 368.

Other embodiments of this invention will be apparent to those skilled in the art upon consideration of this specification or from practice of the invention disclosed herein. Various omissions, modifications, and changes to the principles and embodiments described herein may be made by one skilled in the art without departing from the true scope and spirit of the invention which is indicated by the following claims.

What is claimed is:

1. An encapsulated article, comprising:
   (a) a substrate having first and second opposed major faces, each face having an outer periphery;
   (b) a first cover fitted over the first major surface of the substrate, said first cover comprising a first cover face panel overlying at least a portion of the first major surface of the substrate and a first peripheral sidewall positioned beyond the outer periphery of the first major face;
   (c) a second cover fitted over the second major surface of the substrate, said second cover comprising a second cover face panel overlying at least a portion of the second major surface of the substrate and a second peripheral sidewall positioned beyond the outer periphery of the second major face;
   (d) a sideband extending around and bonded to at least a portion of the peripheral sidewalls of the covers such that sideband and the peripheral sidewalls cooperate to form an encapsulating joint.

2. The encapsulated article of claim 1, wherein:
   (i) the first cover includes a first flange extending from the first cover face panel to wrap around and extend partially across a peripheral sidewall of the substrate, wherein the first peripheral sidewall of the first cover is positioned on the first flange; and
   (ii) the second cover includes a second flange extending from the second cover face panel to wrap around and extend partially across a peripheral sidewall of the substrate, wherein the second peripheral sidewall of the second cover is positioned on the second flange, said first and second flanges extending towards each other to define a flange juncture.

3. The encapsulated article of claim 2, wherein each of the flanges includes a respective free end, said free ends of the flanges being spaced apart from each other such that the flanges form a gap at the flange juncture.

4. The encapsulated article of claim 3, wherein the free ends of the flanges contact each other around substantially the entirety of the flange juncture.

5. The encapsulated article of claim 3, wherein the free end of at least one flange is shaped in a manner effective to define a peripheral flange groove at the flange juncture.

6. The encapsulated article of claim 3, wherein the flanges and the sideband each independently comprises a thermoplastic fluoropolymer.

7. The encapsulated article of claim 6, wherein the flanges and the sideband comprise a perfluoroalkoxy polymer (PFA).

8. A method of encapsulating a substrate having first and second opposed major faces with respective outer peripheries, said method comprising the steps of:
   (b) positioning a first cover over the first major face of the substrate such that a peripheral sidewall of the first cover is positioned beyond the outer periphery of the first major face;
   (c) positioning a second cover over the second major face of the substrate such that a peripheral sidewall of the second cover is positioned beyond the outer periphery of the second major face; and
   (d) bonding a sideband around at least a portion of the peripheral sidewalls of the first and second covers such the sideband and peripheral sidewalls cooperate to from an encapsulation joint.

9. The method of claim 8, wherein:
   (i) the first cover includes a first flange extending from the first cover face panel to wrap around and extend partially across a peripheral sidewall of the substrate, wherein the first peripheral sidewall of the first cover is positioned on the first flange; and
   (ii) the second cover includes a second flange extending from the second cover face panel to wrap around and extend partially across a peripheral sidewall of the substrate, wherein the second peripheral sidewall of the second cover is positioned on the second flange, said first and second flanges extending towards each other to define a flange juncture.

10. The method of claim 9, wherein the free ends of the flanges are spaced apart from each other such that the flanges form a gap at the flange juncture.

11. The method of claim 9, wherein the free ends of the flanges are spaced to contact each other around substantially the entirety of the flange juncture.

12. The method of claim 9, wherein the free end of at least one flange is shaped in a manner effective to define a peripheral flange groove.

13. The method of claim 8, wherein the covers and the sideband each independently comprise a thermoplastic polymer selected from the group consisting of a perfluoroalkoxy polymer (PFA), a fluoroethylene polymer (FEP), an ethylene tetra fluoroethylene polymer, (ETFE), a polyvinylidene fluoride polymer (PVDF), a polyvinyl fluoride polymer (PVF), and combinations of these.

14. The method of claim 8, wherein the covers and the sideband comprise a perfluoroalkoxy polymer (PFA).

15. The method of claim 9, further comprising the step of, after positioning the first and second covers onto the turntable platform, attaching the free end of the first cover flange to the free end of the second cover flange at one or more attachment portions.

16. A centrifugal spray processor for processing microelectronic devices, comprising:
   (a) a processing chamber;
   (b) a turntable platform rotatably mounted in the processing chamber, said turntable platform comprising a top surface, a bottom surface, and a plurality of uprights projecting upward from the top surface in a manner effective to support a plurality of wafer cassettes during spray processing;
   (c) a spray post positioned in the processing chamber in a manner effective to deliver one or more chemicals onto a plurality of microelectronic devices stored in the wafer cassettes during processing;
   (d) a first encapsulating cover fitted over at least a portion of the first major surface of the turntable platform, said first cover comprising a first cover face panel overlying at least a portion of the first major surface of the platform and a first peripheral sidewall extending beyond the outer periphery of the first major face;
   (e) a second encapsulating cover fitted over at least a portion of the second major surface of the turntable platform, said second cover comprising a second cover face panel overlying at least a portion of the second major surface of the platform and a second peripheral sidewall extending beyond the outer periphery of the second major face;
   (f) a sideband extending around and bonded to at least a portion of the peripheral sidewalls of the first and second covers such the sideband and the peripheral sidewalls cooperate to form an encapsulating joint.

17. An apparatus for processing microelectronic devices comprising an encapsulated turntable on which one or more microelectronic devices are supported for processing, said turntable comprising:

(a) a turntable platform comprising first and second opposed major faces and a peripheral sidewall interconnecting said faces;

(b) a first cover fitted over the first major surface of the turntable platform, said first cover comprising a first cover face panel overlying at least a portion of the first major surface of the platform and a first free distal end extending from the first cover beyond the peripheral sidewall;

(c) a second cover fitted over the second major surface of the turntable platform, said second cover comprising a second cover face panel overlying at least a portion of the second major surface of the platform and a second free distal end extending from the second cover face beyond the peripheral sidewall, wherein a gap is formed between the first and second free distal ends adjacent to the peripheral sidewall; and (d) a sideband extending around at least a portion of the peripheral sidewall and being bonded to at least the first and second free distal ends and overlying said the gap such that the sideband and the first and second free distal ends cooperate to form an encapsulating joint over the underlying portion of the sidewall.

* * * * *